US011270156B2

(12) United States Patent
Cogan et al.

(10) Patent No.: US 11,270,156 B2
(45) Date of Patent: Mar. 8, 2022

(54) MACHINE LEARNING FOR DYNAMICALLY UPDATING A USER INTERFACE

(71) Applicant: Optum Services (Ireland) Limited, Dublin (IE)

(72) Inventors: Peter Cogan, Dublin (IE); Lorcan B. MacManus, County Kildare (IE); Conor Breen, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 647 days.

(21) Appl. No.: 16/021,289

(22) Filed: Jun. 28, 2018

(65) Prior Publication Data

US 2020/0005080 A1 Jan. 2, 2020

(51) Int. Cl.
*G06K 9/62* (2006.01)
*G06F 3/0482* (2013.01)
*G06Q 10/10* (2012.01)
*G06F 9/54* (2006.01)
*G06N 20/00* (2019.01)

(52) U.S. Cl.
CPC ......... *G06K 9/6228* (2013.01); *G06F 3/0482* (2013.01); *G06F 9/546* (2013.01); *G06K 9/6257* (2013.01); *G06N 20/00* (2019.01); *G06Q 10/10* (2013.01)

(58) Field of Classification Search
CPC .. G06K 9/6228; G06K 9/6257; G06K 9/6256; G06F 3/0482; G06F 9/546; G06N 20/00; G06N 20/20; G06N 5/025; G06Q 10/10
See application file for complete search history.

(56) References Cited

U.S. PATENT DOCUMENTS

| 7,818,188 | B1 | 10/2010 | Allsup et al. |
| 7,840,422 | B1 | 11/2010 | Hail et al. |
| 8,311,960 | B1 * | 11/2012 | Ginzburg ............... G06N 5/022 706/13 |
| 8,498,945 | B1 * | 7/2013 | Remington ............ G06Q 50/18 705/311 |
| 8,762,180 | B2 | 6/2014 | Ghani et al. |
| 8,775,217 | B1 | 7/2014 | Hail et al. |
| 9,299,108 | B2 | 3/2016 | Diana et al. |
| 10,540,437 | B2 * | 1/2020 | Fougner ................ H04L 51/046 |
| 10,546,340 | B1 * | 1/2020 | Ross ................... G06Q 30/0631 |
| 10,733,566 | B1 * | 8/2020 | Chan ...................... G06N 20/00 |
| 2006/0200407 | A1 | 9/2006 | Hartley et al. |
| 2013/0226623 | A1 * | 8/2013 | Diana .................... G06Q 10/10 705/4 |
| 2014/0081652 | A1 | 3/2014 | Klindworth |
| 2014/0149128 | A1 * | 5/2014 | Getchius ................ G06Q 10/10 705/2 |

(Continued)

OTHER PUBLICATIONS

Lin et al., An Ensemble Random Forest Algorithm for Insurance Big Data Analysis, Jul. 2017, pp. 2-8, DOI 10.1109/ACCESS.2017.2738069, IEEE Access.

*Primary Examiner* — Andrew L Tank
(74) *Attorney, Agent, or Firm* — Alston & Bird LLP

(57) ABSTRACT

Methods, apparatus, systems, computing devices, computing entities, and/or the like for using machine-learning concepts to determine predicted recovery rates/scores for claims, determine priority scores for the claims, and prioritizing the claims based on the same, and updating a user interface based at least in part on the prioritization of the same.

21 Claims, 7 Drawing Sheets

(56) References Cited

U.S. PATENT DOCUMENTS

| | | | |
|---|---|---|---|
| 2015/0339782 A1* | 11/2015 | Fondekar | G06F 16/00 |
| | | | 705/30 |
| 2016/0125546 A1 | 5/2016 | Bostic et al. | |
| 2017/0193349 A1* | 7/2017 | Jothilingam | G06Q 10/06 |
| 2018/0012136 A1* | 1/2018 | French | G06N 5/003 |
| 2019/0066230 A1* | 2/2019 | Dange | G06Q 30/0205 |

* cited by examiner

FIG. 4A

| Mem_ID | Mem_Age | Mem_Gender | Mem_Loc | Mem_Prof |
|---|---|---|---|---|
| 11111111 | 29 | M | Southeast | Legal |

FIG. 4B

| Diag_Code | Bill_Code | Service_Date |
|---|---|---|
| S82.92XA | 73590, 99213 | 12.30.2018 |

FIG. 4C

| Prov_Loc | Prov_Spec | Prov_Recov_Rate | Prov_Contract |
|---|---|---|---|
| West | 20 | 0.43 | Y |

FIG. 4D

| Over_Amount | Over_Reason | Recover_Amount | Recover_Rate |
|---|---|---|---|
| 100 | Duplicate | 73.4 | 0.734 |

MACHINE LEARNING FOR DYNAMICALLY UPDATING A USER INTERFACE

TECHNOLOGICAL FIELD

Embodiments of the present invention generally relate to machine-learning based methodologies for automatic determinations of risk scores indicative of the likelihood of an overpayment being recoverable, automatic determinations of prioritization scores, and dynamic updates for a user interface regarding the same.

BACKGROUND

As will be recognized, a common problem in claim processing is the overpayment of claims. The causes of overpayments can stem from a variety of reasons, such as claim processing errors, duplicate payments, system limitations, contract errors, and/or the like. Existing methodologies exist to present users (e.g., recovery agents) with the ability to recover all or some portion of the overpayments. However, such methodologies have a variety of shortcomings—chief among them being that overpaid claims are presented to users for recovery based on the recoverable amounts of the claims (e.g., they are typically sorted in order by dollar amount and presented via an interface). However, such existing methodologies do not necessarily present the overpaid claims in an order that yields the best recovery results.

Accordingly, there is a latent need for a rigorous methodology that can predict overpaid claims with the highest likelihood of recovery, determine a priority accordingly, and dynamically present the same via a user interface. This ability would provide actionable insight to users (e.g., recovery agents) and enable them to target the overpaid claims in a much more effective manner. Through applied effort, ingenuity, and innovation, the inventors have developed systems and methods that produce such predictions, scores, and dynamic interface updates. Some examples of these solutions are described in detail herein.

BRIEF SUMMARY

In general, embodiments of the present invention provide methods, apparatus, systems, computing devices, computing entities, and/or the like.

In accordance with one aspect, a method is provided. In one embodiment, the method comprises receiving, by one or more processors, a first claim in real-time for electronic storage in an open claim inventory; determining, by the one or more processors, a predicted recovery score for the first claim using one or more machine learning models, the predicted recovery score indicative of the likelihood that the corresponding claim is recoverable; determining, by the one or more processors, a priority score for the first claim, wherein the priority score for the first claim is based at least in part on the predicted recovery score for the first claim and a first recoverable amount for the first claim; inserting, by the one or more processors, the first claim to a queue data structure, wherein the data structure (a) is associated with a first plurality of claims, and (b) comprises an indication of the priority score for first claim and respective priority scores for the first plurality of claims; prioritizing, by the one or more processors, the first claim and the first plurality of claims into a second plurality of claims; and dynamically providing, by the one or more processors, an update to the user interface to display at least a portion of the second plurality of claims.

In accordance with another aspect, a computer program product is provided. The computer program product may comprise at least one computer-readable storage medium having computer-readable program code portions stored therein, the computer-readable program code portions comprising executable portions configured to receive a first claim in real-time for electronic storage in an open claim inventory; determine a predicted recovery score for the first claim using one or more machine learning models, the predicted recovery score indicative of the likelihood that the corresponding claim is recoverable; determine a priority score for the first claim, wherein the priority score for the first claim is based at least in part on the predicted recovery score for the first claim and a first recoverable amount for the first claim; insert the first claim to a queue data structure, wherein the data structure (a) is associated with a first plurality of claims, and (b) comprises an indication of the priority score for first claim and respective priority scores for the first plurality of claims; prioritize the first claim and the first plurality of claims into a second plurality of claims; and dynamically provide an update to the user interface to display at least a portion of the second plurality of claims.

In accordance with yet another aspect, a computing system comprising at least one processor and at least one memory including computer program code is provided. In one embodiment, the at least one memory and the computer program code may be configured to, with the processor, cause the apparatus to receive a first claim in real-time for electronic storage in an open claim inventory; determine a predicted recovery score for the first claim using one or more machine learning models, the predicted recovery score indicative of the likelihood that the corresponding claim is recoverable; determine a priority score for the first claim, wherein the priority score for the first claim is based at least in part on the predicted recovery score for the first claim and a first recoverable amount for the first claim; insert the first claim to a queue data structure, wherein the data structure (a) is associated with a first plurality of claims, and (b) comprises an indication of the priority score for first claim and respective priority scores for the first plurality of claims; prioritize the first claim and the first plurality of claims into a second plurality of claims; and dynamically provide an update to the user interface to display at least a portion of the second plurality of claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
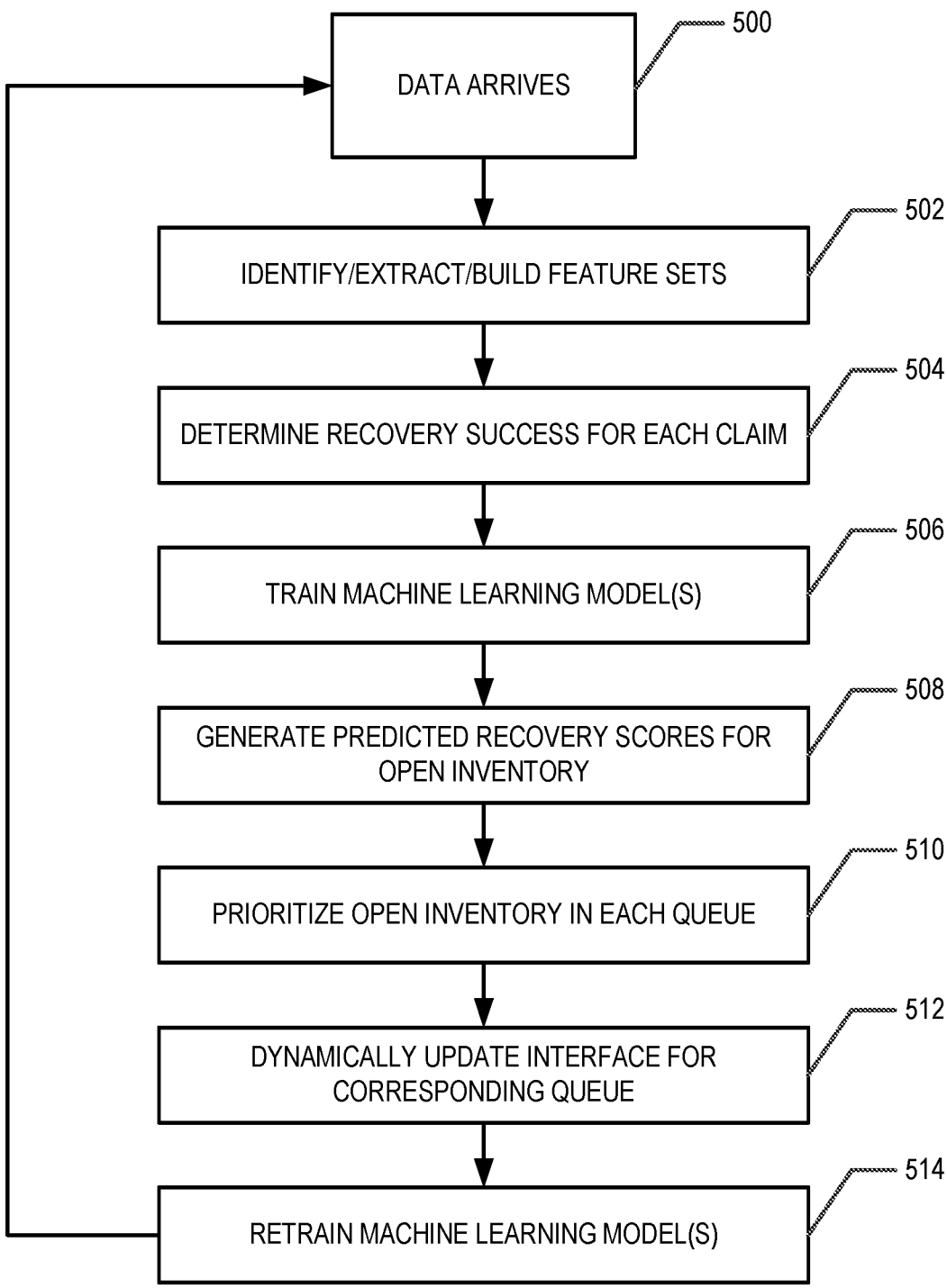
Figure 6:
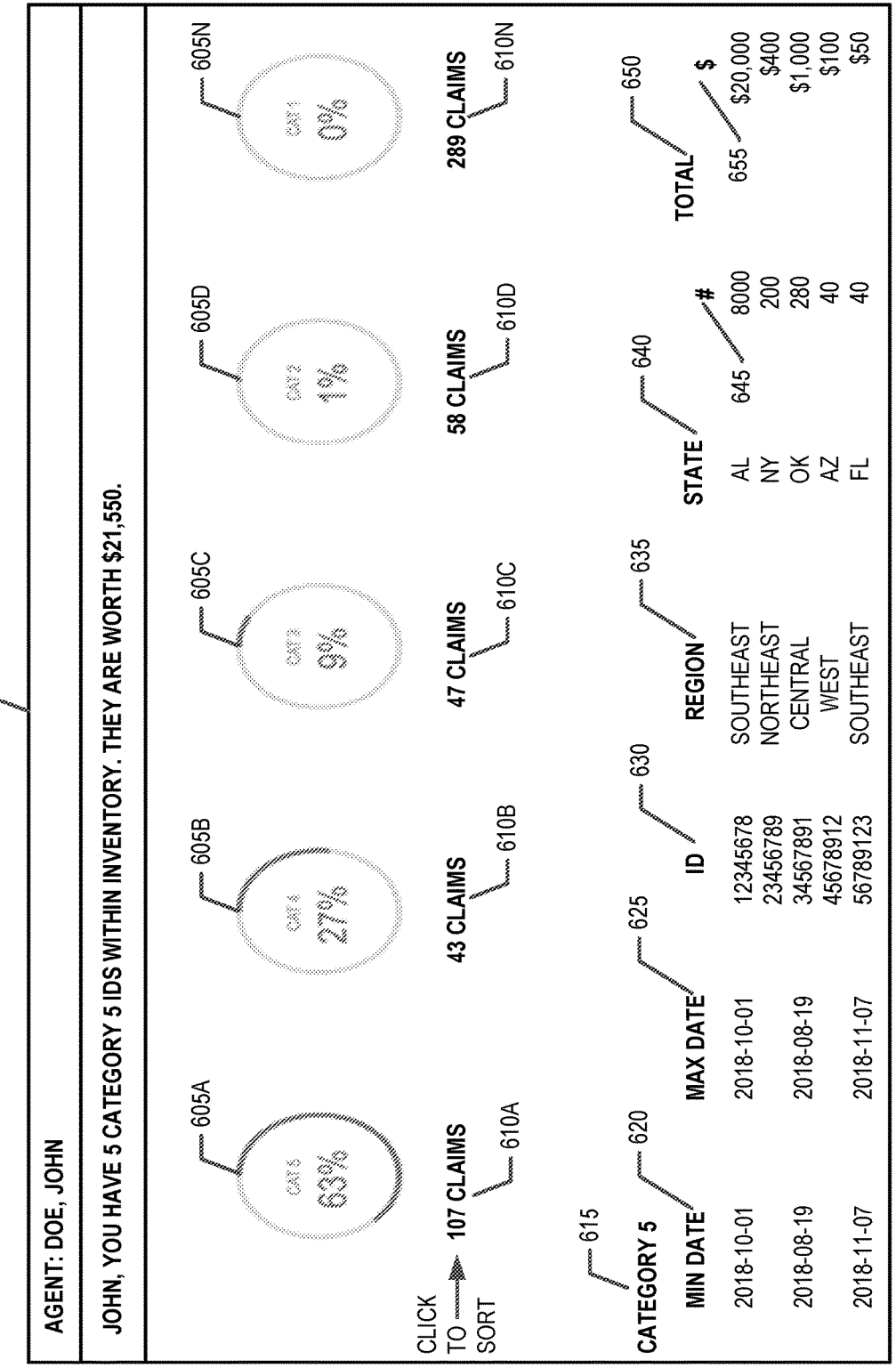

FIGS. 4A, 4B, 4C, and 4D are examples of claim features for use in machine learning in accordance with certain embodiments of the present invention;

FIG. 5 is a flowchart for exemplary operations, steps, and processes in accordance with certain embodiments of the present invention; and FIG. 6 provides and an interactive user interface dynamically updated based at least in part on a machine learning model in accordance with embodiments of the present invention.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1:
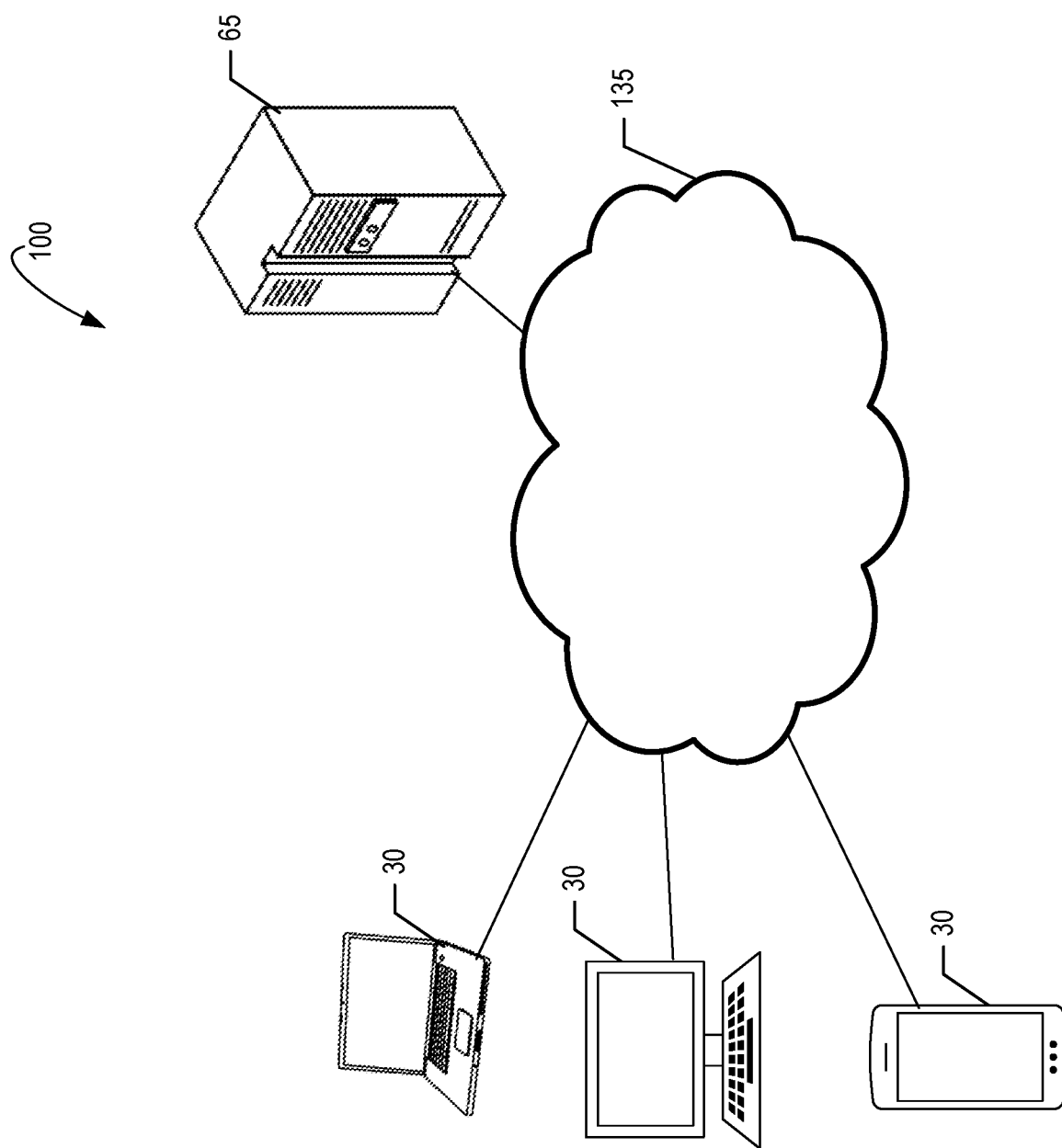
FIG. 1 is a diagram of a recovery prediction system that can be used in conjunction with various embodiments of the present invention.

FIG. 1 provides an illustration of a recovery prediction system 100 that can be used in conjunction with various embodiments of the present invention. As shown in FIG. 1, the recovery prediction system 100 may comprise one or more analytic computing entities 65, one or more user computing entities 30, one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary Analytic Computing Entity

Figure 2A:
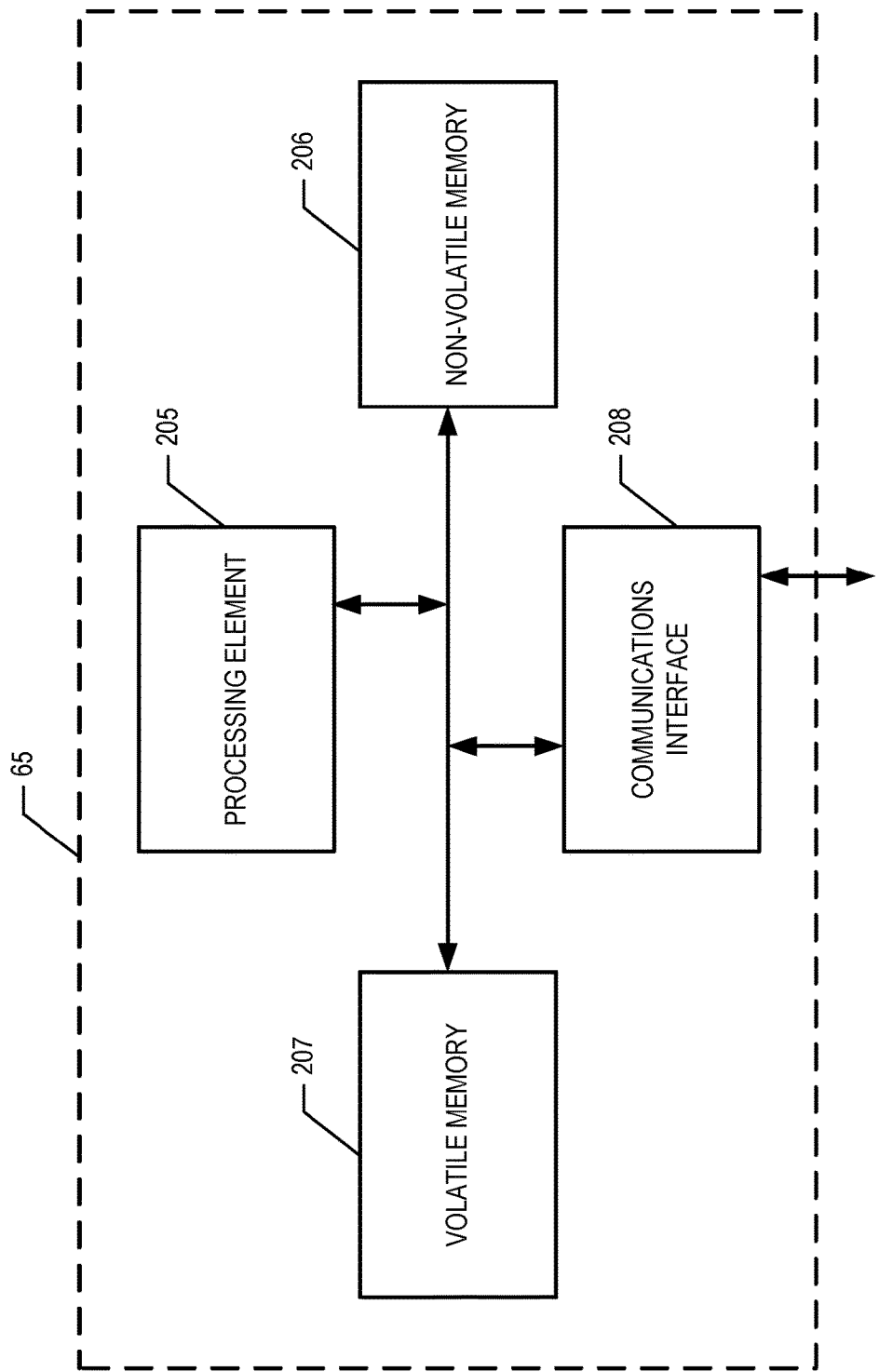
FIG. 2A is a schematic of an analytic computing entity in accordance with certain embodiments of the present invention.

FIG. 2A provides a schematic of an analytic computing entity 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the analytic computing entity 65 may communicate with other computing entities 65, one or more user computing entities 30, and/or the like.

As shown in FIG. 2A, in one embodiment, the analytic computing entity 65 may include or be in communication with one or more processing elements 205 (also referred to as processors, processing circuitry, and/or similar terms used herein interchangeably) that communicate with other elements within the analytic computing entity 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the analytic computing entity 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the recovery prediction system may be stored. As a person of ordinary skill in the art would recognize, the information/data required for the operation of the recovery prediction system may also be partially stored in the cloud data storage system and partially stored in a locally maintained data storage system.

Memory media 206 may include information/data accessed and stored by the recovery prediction system to facilitate the operations of the system. More specifically, memory media 206 may encompass one or more data stores configured to store information/data usable in certain embodiments. For example, as shown in FIG. 2B, data stores encompassed within the memory media 206 may comprise provider information/data 211, recovery information/data 212, claim information/data 213, member data, and/or the like.

Figure 2B:
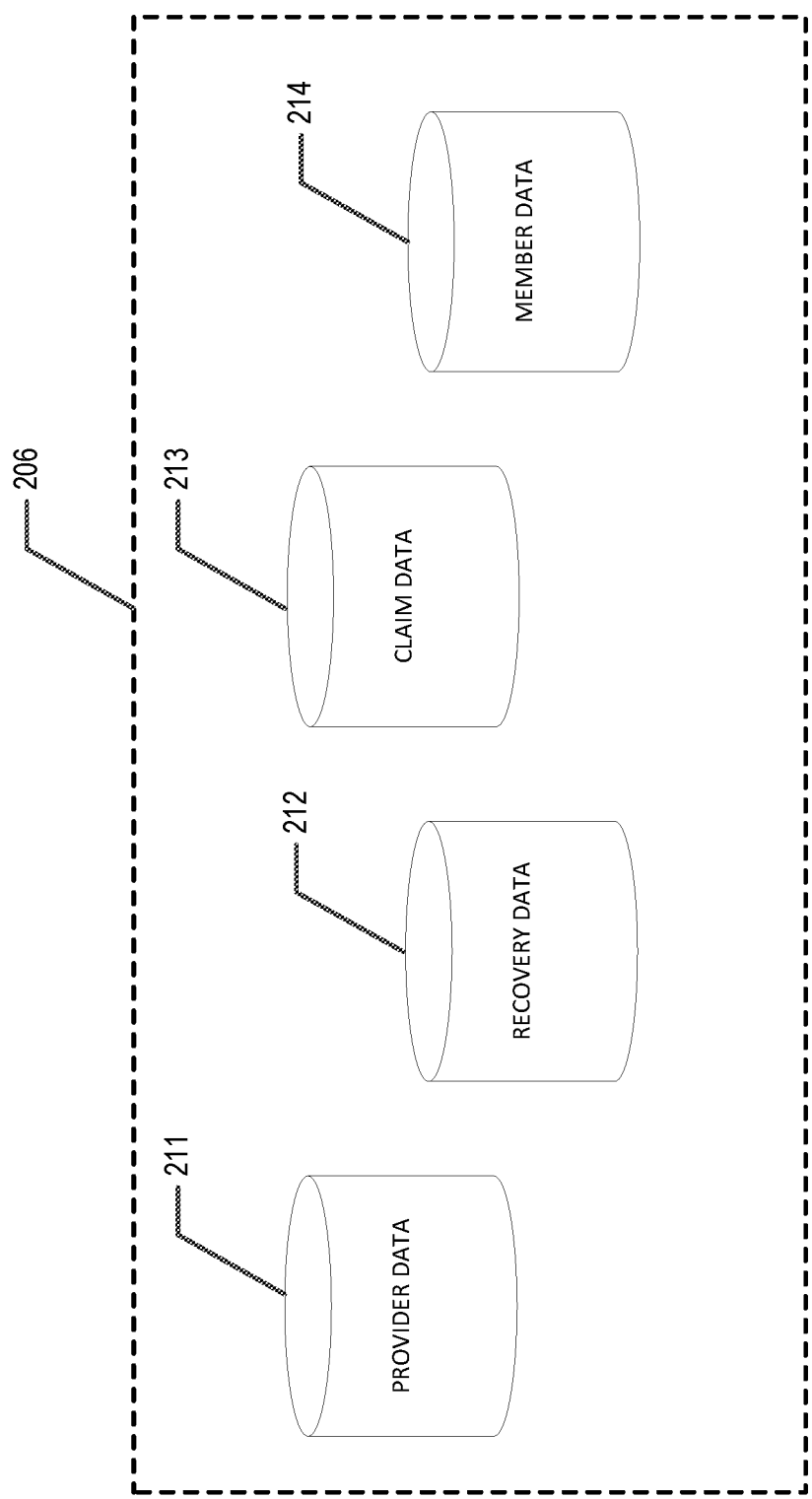
FIG. 2B is a schematic representation of a memory media storing a plurality of repositories, databases, and/or relational tables.

As illustrated in FIG. 2B, the data stores 206 may comprise provider information/data 211 having identifying information/data indicative of various providers. For example, the provider information/data 211 may comprise provider identifiers, provider locations, provider recovery rates, and/or the like. The provider information/data may further comprise provider flag information/data providing an indicator conveying that the provider is involved in an ongoing investigation or may need the provider's claims flagged for overpayment or fraud review.

Continuing with FIG. 2B, the data stores 206 may comprise recovery information/data 212. The recovery information/data may comprise claims that have potentially recoverable amounts, recovery rates for providers, recovery rates for time periods, recovery rates for geographic locations, and/or the like.

Continuing with FIG. 2B, claim information/data may comprise claim information/data 213 indicative of claims filed on behalf of a provider for services or products. Examples of providers include medical doctors, nurse practitioners, physician assistants, nurses, other medical professionals practicing in one or more of a plurality of medical specialties (e.g., psychiatry, pain management, anesthesiology, general surgery, emergency medicine, etc.), hospitals, urgent care centers, diagnostic laboratories, surgery centers, and/or the like. Moreover, the claim information/data 213 may further comprise prescription claim information/data. Prescription claim information/data may be used to extract information/data such as the identity of entities that prescribe certain drugs and the pharmacies who fulfill such prescriptions.

The data stores 206 may further store member information/data 214 used by the recovery prediction system. For example, member information/data 212 stored by the data store may comprise member death information/data indicative of the identity of members, such as their name, date of birth, date of death, and other identifying information/data such as a social security number or member identification number. The member information/data 212 may also comprise member flag information/data indicative of the identity of various members that have been flagged and/or otherwise identified as being of high risk and/or interest for claim review for overpayment or fraud.

In one embodiment, the analytic computing entity 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the analytic computing entity 65 with the assistance of the processing element 205 and operating system.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the analytic computing entity 65 may communicate with computing entities or communication interfaces of other computing entities 65, user computing entities 30, and/or the like.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the analytic computing entity 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The analytic computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the analytic computing entity's components may be located remotely from other analytic computing entity 65 components, such as in a distributed system. Furthermore, one or more of the components may be aggregated and additional components performing functions described herein may be included in the analytic computing entity 65. Thus, the analytic computing entity 65 can be adapted to accommodate a variety of needs and circumstances.

b. Exemplary User Computing Entity

Figure 3:
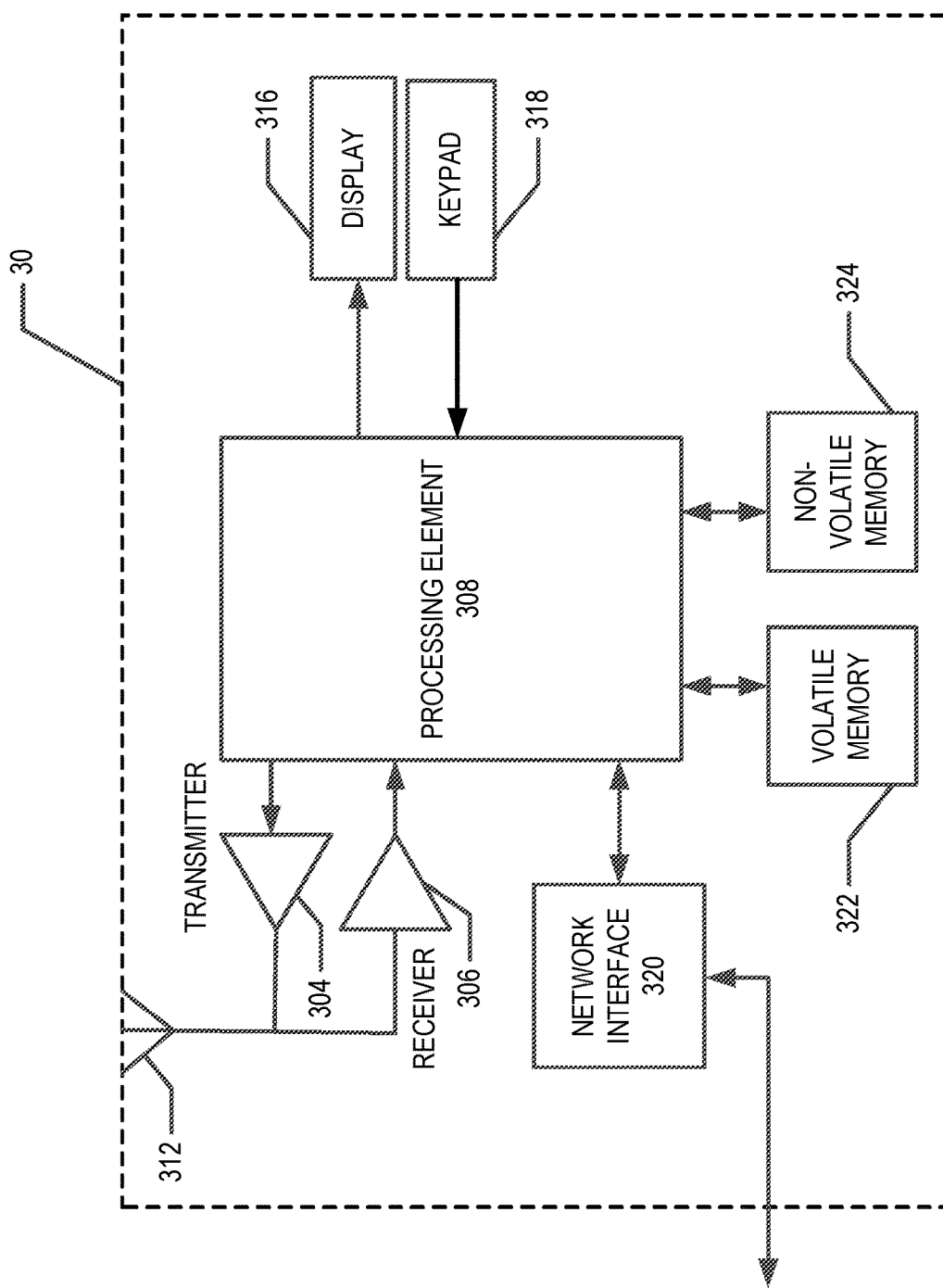
FIG. 3 is a schematic of a user computing entity in accordance with certain embodiments of the present invention.

FIG. 3 provides an illustrative schematic representative of user computing entity 30 that can be used in conjunction with embodiments of the present invention. As will be recognized, the user computing entity may be operated by an agent and include components and features similar to those described in conjunction with the analytic computing entity 65. Further, as shown in FIG. 3, the user computing entity may include additional components and features. For example, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as an analytic computing entity 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MIMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the analytic computing entity 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. EXEMPLARY SYSTEM OPERATION

Reference will now be made to FIGS. 4A, 4B, 4C, 4D, 5, and 6. FIGS. 4A-4D provide exemplary features and/or feature sets. FIG. 5 provides a flowchart of operations and/or processes for carrying out embodiments of the present invention. And FIG. 6 provides an exemplary interface that can be generated and/or populated using machine learning.

a. Brief Overview

As indicated, there is a latent need for a rigorous methodology that can predict overpaid claims with the highest likelihood of recovery, determine priority scores based at least in part on the same, and dynamically present the prioritized results via a user interface using both time-dependent factors and time-independent factors.

1. Technical Problem

In some instances, recovery agents (e.g., human recovery agents) may be considered a scarce resource. Because of this, a technical approach for prioritizing overpaid claims (referred to as claim inventory, recovery inventory, open inventory, open claim inventory, and/or or similar terms used herein interchangeably) to maximize claim recoveries is needed (e.g., recoveries of overpaid claims). Existing solutions simply prioritize and present inventory based on the total amount recoverable. In other words, claim inventory is simply ordered by the largest amount owed and presented via a user interface in that order to be handled accordingly. This human-driven approach has significant drawbacks in that it does not consider or predict the likelihood that an overpaid amount will actually be recovered. Moreover, this human-driven approach does not determine and/or contemplate time-independent and time-dependent features from the available information/data because it is not practical or feasible for a human-implementable system to manually incorporate these factors and/or to continuously prioritize/reprioritize the inventory.

2. Technical Solution

To overcome at least the above-identified technical challenges, machine learning can be used in a continuously learning manner to determine the likelihood of recovery for each claim in inventory and prioritize the inventory using a unique approach for presentation via a dynamically updatable user interface. As will be recognized, humans simply do not have the ability resolve all of the hidden correlations in the time-independent information/data and the time-dependent information/data. And even if that were somehow possible, any such derivations would be out-of-date by the amount of time that would be required to deploy any human-implementable solution. By using machine learning, though, vast amounts of time-independent information/data and the time-dependent information/data can be continuously analyzed to adapt to, for example, changing legislation, operations, and environments to quickly deploy a solution that is accurate, up-to-date, and computationally efficient to continuously deploy models that are accurate and responsive to the dynamic conditions. This disclosure describes a machine learning approach that can analyze vast amounts of information/data in a computational efficient manner to train one or more machine learning models, use the one or more machine learning models to determine predictions for the claim inventory, determine priority scores for the claim inventory based on the predictions, prioritize the inventory, and dynamically update a user interface.

b. Recovery Agents

In one embodiment, a user (such as a recovery agent) may navigate a user interface 600 by operating a user computing entity 30. Through the user interface 600, the user (e.g., recovery agent) may view and access claim inventory, claim information/data, member information/data, provider information/data, recovery information/data, and/or the like. To do so, the recovery prediction system 100 may provide access to the system via a user profile that has been previously established and/or stored. In an example embodiment, a user profile comprises user profile information/data, such as a user identifier configured to uniquely identify the user, a username, user contact information/data (e.g., name, one or more electronic addresses such as emails, instant message usernames, social media user name, and/or the like), user preferences, user account information/data, user credentials, information/data identifying one or more user computing entities 30 corresponding to the user, and/or the like.

In various embodiments, the user profile may be associated with one or more queues assigned to the user (e.g., recovery agent). The queues can be updated continuously, regularly, and/or in response to certain triggers. Moreover, the queues may be any of a variety of data structures that allow for efficient and dynamic prioritization and reprioritization, such as array data structures, heap data structures, map data structures, linked list data structures, tree data structures, and/or the like. Dynamically updating a queue associated with a particular user (e.g., recovery agent) can cause an active user interface 600 with which the user is interacting to automatically be updated.

In other embodiments, a recovery agent may be an artificial recovery agent, such as artificial intelligence (AI) bots that can perform at least some or a subset of the functions of a human recovery agent. In such an embodiment, each artificial recovery agent can be associated with one or more queues and benefit from the techniques and approaches described herein.

c. Feature Processing

In various embodiments, whether training a machine learning model or determining predictions for open inventory, claim information/data can be accessed or received in a variety of manners (e.g., step/operation 500 of FIG. 5). Then, to train a machine learning model, features sets are identified or extracted from the claim information/data. As will be recognized, claim information/data may comprise various types of information/data. FIGS. 4A, 4B, 4C, and 4D represent at least portions of feature sets that can identified or extracted from the claim information/data.

For context in understanding embodiments of the present invention, when a claim is received by a claims system (not shown), the claim represents a request for payment/reimbursement for services rendered, materials used, equipment provided, and/or the like. For example, a claim may be a request for payment/reimbursement for a consultation with a primary care doctor, a medical procedure or an evaluation performed by an orthopedic surgeon, a laboratory test performed by a laboratory, a surgery, durable medical equipment provided to an injured patient, medications or other materials used in the treatment of a patient, and/or the like. As will be recognized, though, embodiments of the present invention are not limited to the medical context. Rather, they may be applied to a variety of other settings, such as automotive claims, repair claims, and/or the like.

In one embodiment, each claim may be stored as a record that comprises a textual description of the type of claim to which the record corresponds and comprises member features (FIG. 4A), claim features (FIG. 4B), provider features (FIG. 4C), and/or recovery features (4D). The various features and feature sets can be identified in a manual, semi-automatic, and/or automatic manner for identification and/or extraction for a given claim (operation/step 502 of FIG. 5).

FIG. 4A provides a subset of member features that can be associated with a given member, provider, claim, and/or recovery. As used herein, the term member may refer to a person who receives healthcare services or products rendered by a provider and/or who relies on financing from a health insurance payer to cover the costs of the rendered health services or products. In that sense, a member is associated with the health insurance payer and is said to be a member of (a program associated with) of the health insurance payer. In one embodiment, member features can include, but are not limited to, age, gender, poverty rates, known health conditions, home location, profession, access to medical care, medical history, claim history, member identifier (ID), and/or the like.

FIG. 4B provides a subset of claim features that can be associated with a given member, provider, claim, and/or recovery. The claims features may continuously change (e.g., be time-dependent) for many reasons, such as the prevalence of certain diseases, the emergence of new diseases (e.g., representing new claim), and/or previous medical codes being introduced and/or discontinued.

Example claim features may include a claim ID and the date a claim was received—e.g., Dec. 14, 2013, at 12:00:00 pm and time stamped as 2013-12-14 12:00:00. The claim features may also include one or more diagnostic codes, treatment codes, treatment modifier codes, and/or the like. Such codes may be any code, such as Current Procedural Terminology (CPT) codes, billing codes, Healthcare Common Procedure Coding System (HCPCS) codes, ICD-10-CM Medical Diagnosis Codes, and/or the like.

By way of example of billing codes, a patient may visit a doctor because of discomfort in his lower leg. During the visit, the doctor may examine the patient's lower leg and take an x-ray of the lower leg as part of an examination. The claim for the visit may have two distinct billing codes: billing code 99213 and billing code 73590. Billing code 99213 may be used to request payment/reimbursement for the visit, examination, and evaluation of the patient. Billing code 73590 may be used to request payment/reimbursement for the x-ray of the leg. Using such codes and code sets, various correlations can be determined as they related to recoverability.

FIG. 4C provides a subset of provider features that can be associated with a given member, provider, claim, and/or recovery. A provider may refer to an entity that provides services or products. In at least one embodiment, in the health care context, providers rely on a health insurance payers to finance or reimburse the cost of the services or products provided. For example, a provider may comprise a health professional operating within one or more of a plurality of branches of healthcare, including medicine, surgery, dentistry, midwifery, pharmacy, psychology, psychiatry, pain management, nursing, laboratory diagnostics, and/or the like. A provider may also comprise an organization, such as a private company, hospital, laboratory, or the like, that operates within one or more of a plurality of branches of healthcare. Each provider may be associated with provider features that includes, but are not limited to, demographics (e.g., the location in which the provider operations), contracted status, specialty, and/or one or more recovery rates for the provider. A recovery rate may identify that recovery rate of overpayments to the provider over one or more time periods or epochs (e.g., 1 month, 3 months, 6 months, 12 months, and/or the like).

Similar to claim features, provider features can continuously change (e.g., be time-dependent) for several reasons. For instance, within a given provider, the software, policies for submitting claims, personnel, strategies for submitting claims, experience, and/or the like may change in an unpredictable manner and result in a sudden change to the recoverability associated with that provider.

FIG. 4D provides a subset of recovery features that can be associated with a given member, provider, claim, and/or recovery. As will be recognized, if a claim is in inventory, the claim has been adjudicated, paid, and identified as being overpaid (e.g., being associated with a potentially recoverable amount). The recovery features may include, but are not limited to, a potentially recoverable amount (e.g., overpayment), an overpayment reason, a recovered amount, and a recovery rate. With regard to recovery rates, each claim may be associated with a recovery rate (e.g., a claim recovery rate), and each provider may be associated with one or more separate recovery rates (e.g., provider a recovery rate).

As will be recognized, the recovery features can continuously change, both for specific providers and for the provider population in general. For example, this can result from new overpayment reasons being identified or old ones becoming less relevant. The frequency of occurrence of overpayment reasons can increase or decrease depending on a variety of factors. Such factors include contract renewals, adjudication software changes, claim processing and submission software changes, and/or the like. Since the recoverability may be impacted by the overpayment reason, continuous and unpredictable changes to overpayment reasons can impact recoverability in real-time.

As will be recognized, the member features, claim features, provider features, and recovery features can be used to manually, semi-automatically, or automatically establish, update, and/or modify feature sets. A feature set comprises one or more features from the member features, claim features, provider features, and/or recovery features.

d. Determine a Recovery Success Rate for Each Claim

As indicated in step/operation 504 of FIG. 5, the recovery prediction system 100 (e.g., via an analytic computing entity 65) can receive a set of claims that has been adjudicated, paid, and had at least a portion of an overpaid amount recovered (e.g., a recovered claim). Using the set of claims, the recovery prediction system 100 (e.g., via an analytic computing entity 65) can determine a recovery success rate for each claim. To do so, the recovery prediction system 100 (e.g., via an analytic computing entity 65) identifies or extracts the appropriate features for each claim. The recovery prediction system 100 (e.g., via an analytic computing entity 65) can then determine the recovery success rate for each claim using the following formula a=x/y. In the formula, the recovery success rate for a given claim is the amount recovered divided by the amount owed. Thus, the quotient a represents the recovery success rate, the dividend x represents the recovered amount, and the divisor y represents the amount owed (or the potentially recoverable amount). Table 1 below provides an example of a recovered claim.

TABLE 1

| Claim a |
|---|
| y = Amount Owed: $100 |
| x = Amount Recovered: $80 |
| a = Recovery Success Rate: .80 |

The recovery success rate can be determined for each claim. The recovery prediction system 100 (e.g., via an analytic computing entity 65) can use such information/data as a training dataset and/or a cross-validation (or test) dataset—with the target output or variable being the recovery success rate. The recovery success rate can also be used to trigger retraining of one or more machine learning models.

e. Train Machine Learning Model

As previously indicated, embodiments of the present invention use one or more machine learning models to predict a recovery score for each unseen claim in open inventory. Thus, as will be recognized, training one or more machine learning algorithms to generate one or more machine learning models involves providing a training dataset to the machine learning algorithms (step/operation 506 of FIG. 5). The training dataset contains the target output or variable that the machine-learning model is to eventually predict. The machine-learning algorithm detects patterns in the training dataset that map the input information/data attributes from the feature sets to the target output or variable and captures these patterns. The resulting machine-learning model is then able to generate predictions for new or unseen information/data for which the target is unknown.

The predictions can be determined in real-time—such as when a new claim is received in inventory. By performing real-time predictions, a user interface for a given agent can also be updated dynamically to provide the most up-to-date and prioritized claim information/data.

In one embodiment, the disclosed approach uses supervised machine learning. With embodiments of the present invention, exemplary machine learning algorithms may include general purpose classification or regression algorithms, such as random forest or random decision forest algorithms and/or gradient boost algorithms. As will be recognized, a variety of different machine learning algorithms and techniques can be used within the scope of embodiments of the present invention.

As a result of the training, one or more machine learning models are generated to subsequently predict recovery scores of unseen claims. For instance, using the machine learning model, the recovery prediction system 100 (e.g., via an analytic computing entity 65) generates predicted recovery rates/scores for unseen claims. As will also be recognized from the discussion regarding the feature sets, the described machine learning model is capable of ingesting numeric information/data (such as claim balance) and categorical information/data (such as a member or provider location).

As will be appreciated, the hidden and/or weak correlations found as a result of the machine learning are simply not practical for human-implementation. In addition to outputting predicted recovery rates/scores of unseen claims in inventory, the machine learning models can be updated on a continuous, regular, or triggered basis.

f. Score Open Inventory using Machine Learning Model

As indicated by step/operation 508, with one more machine learning models generated, the recovery prediction system 100 (e.g., via an analytic computing entity 65) can use the one or more machine learning models to generate predicted recovery rates/scores for (e.g., score) unseen claims in open inventory. Unseen claims in open inventory are claims that have been adjudicated, paid, and indicated as having some amount of overpayment.

In various embodiments, the open inventory of claims can be scored using a variety of approaches. For example, in one embodiment, open inventory may refer to all open inventory (at an inventory level), such that the scoring is performed in batch for all claims in inventory. In another embodiment, open inventory may refer to a subset of all open inventory (e.g., at a queue level assigned to a particular queue associated with a user), such that claims in a particular queue are scored together. And in yet another embodiment, claims can be scored in real-time as they are received in open inventory (individually or in batch). Thus, responsive to the recovery prediction system 100 (e.g., via an analytic computing entity 65) receiving one or more unseen claims, the recovery prediction system 100 (e.g., via an analytic computing entity 65) can score (e.g., generate a predicted recovery rate/score for) the one or more unseen claims. For context, Table 2 below provides example predicted recovery rates/scores as output from the one or more machine learning models. This example includes 5 claims: claim a, claim b, claim c, claim d, and claim e.

TABLE 2

| Predicted Recovery Rates/Scores |
|---|
| Claim a: 0.4 |
| Claim b: 0.2 |

TABLE 2-continued

Predicted Recovery Rates/Scores

Claim c: 0.8
Claim d: 0.4
Claim e: 0.7

In these examples, each of the above claims has a predicted recovery rate/score in the domain [0,1].

As will be recognized, the set of open inventory (e.g., unrecovered claims) is highly dynamic and changes continuously during a given time period, such as a working day. Such changes are continuous due to the continuous nature of claim processing, overpayment identification, and recovery payment operations. For example, a given claim that is part of open inventory at the beginning of a work day could be removed from open inventory a few minutes later once a recovered amount is recorded by the recovery prediction system 100 as having been received. Similarly, new claims can appear in open inventory during a work day as overpayment processes continuously execute. This necessitates a continuous scoring, prioritizing, and reprioritizing of open inventory (on an inventory level or a queue level).

The individually scored claims can also be assigned to one or more queues before, during, and/or after scoring. Once assigned to a particular queue, the corresponding user (e.g., recovery agent) has the ability to access claim information/data through a user interface 600 based at least in part on his or her access credentials. The claims can be assigned to queues using a variety of techniques and approaches.

g. Prioritize Inventory

In one embodiment, the recovery prediction system 100 (e.g., via an analytic computing entity 65) can prioritize the open inventory at an inventory level, a queue level, and/or the like. To prioritize a set of claims in open inventory, embodiments of the present invention use a non-conventional approach. For example, existing methodologies for prioritization typically stack rank claims based on the total amount due (e.g., the amount of overpayment). Using this conventional approach, the recovery prediction system 100 (e.g., via an analytic computing entity 65) would simply order the claims based on the overpayment amounts. Continuing the above example, claims a, b, c, d, and e have respective overpayments of a: $100, b: $1,000, c: $50, d: $20,000, e: $400. Using the conventional prioritization approach, the recovery prediction system 100 (e.g., via an analytic computing entity 65) would prioritize the claims as indicated below in Table 3.

TABLE 3

Conventional Ranking (d, b, e, a, c)

Claim d: $20,000
Claim b: $1,000
Claim e: $400
Claim a: $100
Claim c: $50

However, conventional methodologies have shortcomings in that it they do not contemplate the likelihood of actually recovery of each claim. Thus, a new and non-conventional approach for prioritization is also disclosed. In this new and non-conventional approach (step/operation 510 of FIG. 5), prioritization comprises at least two steps: (1) determining a priority score for each claim based at least in part on the amount owed and the predicted recovery rate/score, and (2) ordering the claims based at least in part on the same. In other words, the claims being prioritized are ordered by the product of the predicted recovery rate/score and the outstanding claim balance: $a=yx$. In this equation, a is the product (or priority number) with y representing the machine learning model's predicted recovery rate/score and x representing the potentially recoverable amount.

With the same example claims a, b, c, d, and e, this new and non-conventional approach would determine a different priority order than conventional methodologies. The respective overpayments of these claims are a: $100, b: $1,000, c: $50, d: $20,000, e: $400, and the predicted recovery rates/scores for the claims are a: 0.4, b: 0.2, c: 0.8, d: 0.4, e: 0.7. Thus, using the equation $a=yx$, the corresponding products are a: 40, b: 200, c: 40, d: 8000, e: 280. The priority ranking using this non-conventional approach would claim d, claim e, claim b, claim a, claim c as indicated below in Table 4.

TABLE 4

Non-Conventional Ranking (d, e, b, a, c)

Claim d: 8000
Claim e: 280
Claim b: 200
Claim a: 40
Claim c: 40

Accordingly, the open inventory priority—whether at an inventory level or a queue level—contemplates both the potentially recoverable amount and the likelihood of recovery. As such, the inventory would be prioritized in the order the following order: d, e, b, a, c.

In one embodiment, a variety of techniques and approaches can be used to sort/order and/or the store the claims based on their priority. In one embodiment, each claim comprises an indication of its priority score. Because of how the priority scores are determined, this score is independent of other claims and therefore can follow each claim. Thus, if claims are provided to users (e.g., recovery agents) in an environment in which the next available agent is pushed the next highest priority claim, claim d would be the first claim pushed to a user interface 600 for the next available user for handling. However, in an environment in which each user is assigned a queue of claims, the user's user interface 600 would be dynamically updated to reflect the claim in priority order. In this example, the queue can be resorted each time a new claim is added, or the user interface 600 may be configured to display a set of claims based at least on their priority scores. As will be recognized, a variety of other approaches and techniques can be used to adapt to various needs and circumstances. For example, the recovery prediction system 100 (e.g., via an analytic computing entity 65) may continuously determine predicted recovery rates/scores for unseen claims, continuously determine priority scores after determining the predicted recovery rates/scores, continuously add or inserts the unseen claims to one or more queues, prioritize the claims, and continuously push the updates to one or more user interfaces 600 in parallel.

h. Dynamically Update User Interface

As indicated above, a queue assigned to a particular user can be provided by the recovery prediction system 100 (e.g., via an analytic computing entity 65) for accessing, viewing, investigating, and/or navigating via a user interface 600 being displayed by a user computing entity 30. Thus, the user interface 600 can be dynamically updated to show the most current priority order of claims, for example, assigned to a user (e.g., recovery agent) at any given time (step/operation 512 of FIG. 5). For instance, if a claim in a queue is resolved and has a payment applied, the recovery prediction system 100 (e.g., via an analytic computing entity 65) can push an update to the corresponding queue and updating the priority order of the queue. In another embodiment, the user interface 600 may dynamically update the queue being displayed on a continuous or regular basis or in response to certain triggers.

As shown via the user interface 600 of FIG. 6, the user interface may comprise various features and functionality for accessing, viewing, investigating, and/or navigating claims in open inventory or in a queue. In one embodiment, the user interface 600 may identify the user (e.g., recovery agent) credentialed for currently accessing the user interface 600 (e.g., John Doe). The user interface 600 may also comprise messages to the user in the form of banners, headers, notifications, and/or the like.

In one embodiment, the user interface 600 may display one or more claim category elements 605A-605N. The terms elements, indicators, graphics, icons, images, buttons, selectors, and/or the like are used herein interchangeably. In one embodiment, the claim category elements 605A-605N may represent respective queues assigned to a credentialed user. For example, claim category element 605A may represent a first queue assigned to a user, claim category element 605B may represent a second queue assigned to the user, and so on. In another embodiment, the claim category element 605A-605N may represent portions of a single queue assigned to the user based on threshold amounts. For example, the claim category element 605A may represent claims having a priority score within a first threshold, the claim category element 605B may represent claims having a priority score within a second threshold, and so on. In yet another embodiment, the claim category elements 605A-605N may comprise all of the claims in open inventory and allow for reviewing the status of claims within particular thresholds. In one embodiment, each claim category element 605A-605N may be selected to control what the user interface 600 displays as the information/data in elements 615, 620, 625, 630, 635, 640, 645, 650, 655, and/or the like. For example, if claim category element 605A is selected via a user computing entity 30, elements 615, 620, 625, 630, 635, 640, 645, 650, and 655 are dynamically populated with information/data corresponding to category 5 claims.

In one embodiment, each claim category element 605A-605N may further be associated with category sort elements 610A-610N. The category sort elements 610A-610N may be selected via the user computing entity 30 to control how the user interface 600 sorts and displays the information/data in elements 615, 620, 625, 630, 635, 640, 645, 650, 655, and/or the like.

In one embodiment, elements 615, 620, 625, 630, 635, 640, 645, 650, 655, and/or the like may comprise claims (and at least a portion of their corresponding information/data) for a particular category. For example, element 615 may be selectable for sorting and represent the category of claims selected via a claim category element 605A-605N. Elements 620 and 625 may be selectable elements for sorting and represent minimum and maximum dates the claims were submitted, processed, and/or flagged for overpayment. Element 630 may be selectable for sorting and represent the ID of the claim, the ID of a provider who submitted the claim, the ID of a member to whom the claim corresponds, a tax identification number of a provider, and/or the like. Elements 635 and 640 may be selectable for sorting and represent location information for the corresponding claim line. And elements 645, 650, and 650 may be selectable for sorting and respectively represent the priority score, the amounts overpaid, the predicted recovery rate/score, and/or the like of the claims being displayed. As will be recognized, the described elements are provided for illustrative purposes and are not to be construed as limiting the dynamically updatable interface in any way. As indicated above, the user interface 600 can be dynamically updated to show the most current priority order of claims at an inventory level, a queue level, and/or the like.

i. Retraining

In one embodiment, the recovery prediction system 100 continuously retrains the models to adapt to changes in claim features, member features, provider features, recovery features, and/or the like (step/operation 514 of FIG. 5). For example, a given provider who previously had a relatively good recovery rate may suddenly have a poor recovery rate. Such a change may be due to time-dependent factors (e.g., due to a change in policy) and/or time-independent factors. As a result, the predicted recovery rates/scores determined by the one or more machine learning models become stale. Thus, the recovery prediction system 100 continuously retrains the machine learning models by rapidly generating the new feature sets and determining recovery success rates from new claims for retraining.

As will be recognized, the retraining may be initiated in a variety of ways. In one embodiment, the recovery prediction system 100 can retrain the one or more machine learning models on a fixed schedule (e.g., hourly, daily, weekly, and/or the like). In another embodiment, the recovery prediction system 100 can retrain the one or more machine learning models based at least in part on one or more automated triggers. For example, the recovery prediction system 100 may execute change detection algorithms to detect changes in claim features, provider features, member features, and/or recovery features. Examples of such changes may be the discontinued use of particular codes, use of new codes, changes in recovery rates for providers, changes in recovery rates for types of claims, changes in particular distributions, new locations being services, types of plans being accepted, and/or the like.

VI. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for dynamically updating a user interface, the method comprising:
receiving, by one or more processors, a plurality of claims in real-time for electronic storage in an open claim inventory, the plurality of claims comprising a first claim and a second claim;
determining, by the one or more processors, a first predicted recovery score for the first claim and a second predicted recovery score for the second claim using one or more machine learning models, wherein each predicted recovery score is indicative of the likelihood that the corresponding claim is recoverable;

determining, by the one or more processors, a first priority score for the first claim and a second priority score for the second claim, wherein each priority score is determined based at least in part on the corresponding predicted recovery score and a corresponding recoverable amount;

inserting, by the one or more processors, the first claim in a first queue data structure, wherein the first queue data structure (a) is associated with a first plurality of claims, and (b) comprises an indication of the first priority score for the first claim and respective priority scores for the first plurality of claims;

inserting, by the one or more processors, the second claim in a second queue data structure, wherein the second queue data structure (a) is associated with a second plurality of claims, and (b) comprises an indication of the second priority score for the second claim and respective priority scores for the second plurality of claims;

prioritizing, by the one or more processors, (a) the first claim and the first plurality of claims in the first queue data structure, and (b) the second claim and the second plurality of claims in the second queue data structure; and dynamically providing, by the one or more processors, an update to (a) a first user interface element associated with the first queue data structure, and (b) a second user interface element associated with the second queue data structure, wherein the user interface displays the update (a) to the first user interface element, and (b) the second user interface element.

2. The computer-implemented method of claim 1 further comprising:
extracting a first feature set from a set of training claims;
determining a recovery success rate for each claim of the set of training claims, wherein the recovery success rate is a target output of the one or more machine learning models; and
storing the first feature set and the recovery success rates for the set of training claims as a training dataset.

3. The computer-implemented method of claim 2 further comprising automatically detecting a change in the first feature set and the first claim.

4. The computer-implemented method of claim 2 further comprising training the one or more machine learning models based at least in part on the training dataset.

5. The computer-implemented method of claim 1, wherein the priority score for the first claim is the product of the predicted recovery score for the first claim and the first recoverable amount for the first claim.

6. The computer-implemented method of claim 1, wherein dynamically providing the update to the first user interface element and the second user interface element comprises pushing the update.

7. The computer-implemented method of claim 1 further comprising
determining a predicted recovery score for each of the first plurality of claims; and
determining a priority score for each of the first plurality of claims.

8. A computer program product comprising a non-transitory computer readable medium having computer program instructions stored therein, the computer program instructions when executed by a processor, cause the processor to:

receive a plurality of claims in real-time for electronic storage in an open claim inventory, the plurality of claims comprising a first claim and a second claim;

determine a first predicted recovery score for the first claim and a second predicted recovery score for the second claim using one or more machine learning models, wherein each predicted recovery score is indicative of the likelihood that the corresponding claim is recoverable;

determine a first priority score for the first claim and a second priority score for the second claim, wherein each priority score is determined based at least in part on the corresponding predicted recovery score for the first claim and a corresponding recoverable amount;

insert the first claim in a first queue data structure, wherein the first queue data structure (a) is associated with a first plurality of claims, and (b) comprises an indication of the first priority score for the first claim and respective priority scores for the first plurality of claims;

insert, by the one or more processors, the second claim in a second queue data structure, wherein the second queue data structure (a) is associated with a second plurality of claims, and (b) comprises an indication of the second priority score for the second claim and respective priority scores for the second plurality of claims;

prioritize (a) the first claim and the first plurality of claims in the first queue data structure, and (b) the second claim and the second plurality of claims in the second queue data structure; and dynamically provide an update to (a) a first user interface element associated with the first queue data structure, and (b) a second user interface element associated with the second queue data structure, wherein the user interface displays the update (a) to the first user interface element, and (b) the second user interface element.

9. The non-transitory computer readable medium of claim 8, wherein the computer program instructions when executed by a processor, further cause the processor to:
extract a first feature set from a set of training claims;
determine a recovery success rate for each claim of the set of training claims, wherein the recovery success rate is a target output of the one or more machine learning models; and
store the first feature set and the recovery success rates for the set of training claims as a training dataset.

10. The non-transitory computer readable medium of claim 9, wherein the computer program instructions when executed by a processor, further cause the processor to automatically detect a change in the first feature set and the first claim.

11. The non-transitory computer readable medium of claim 9, wherein the computer program instructions when executed by a processor, further cause the processor to train the one or more machine learning models based at least in part on the training dataset.

12. The non-transitory computer readable medium of claim 8, wherein the priority score for the first claim is the product of the predicted recovery score for the first claim and the first recoverable amount for the first claim.

13. The non-transitory computer readable medium of claim 8, wherein dynamically providing the update to the first user interface element and the second user interface element comprises pushing the update.

14. The non-transitory computer readable medium of claim 8, wherein the computer program instructions when executed by a processor, further cause the processor to:
- determine a predicted recovery score for each of the first plurality of claims; and
- determine a priority score for each of the first plurality of claims.

15. A computing system comprising a non-transitory computer readable storage medium and one or more processors, the computing system configured to:
- receive a plurality of claims in real-time for electronic storage in an open claim inventory, the plurality of claims comprising a first claim and a second claim;
- determine a first predicted recovery score for the first claim and a second predicted recovery score for the second claim using one or more machine learning models, wherein each predicted recovery score is indicative of the likelihood that the corresponding claim is recoverable;
- determine a first priority score for the first claim and a second priority score for the second claim, wherein each priority score is determined based at least in part on the corresponding predicted recovery score and a corresponding recoverable amount;
- insert the first claim in a first queue data structure, wherein the first queue data structure (a) is associated with a first plurality of claims, and (b) comprises an indication of the first priority score for the first claim and respective priority scores for the first plurality of claims;
- insert, by the one or more processors, the second claim in a second queue data structure, wherein the second queue data structure (a) is associated with a second plurality of claims, and (b) comprises an indication of the second priority score for the second claim and respective priority scores for the second plurality of claims;
- prioritize the first claim and the first plurality of claims in the first queue data structure, and (b) the second claim and the second plurality of claims in the second queue data structure; and
- dynamically provide an update to (a) a first user interface element associated with the first queue data structure, and (b) a second user interface element associated with the second queue data structure, wherein the user interface displays the update (a) to the first user interface element, and (b) the second user interface element.

16. The computing system of claim 15, wherein the computing system is further configured to:
- extract a first feature set from a set of training claims;
- determine a recovery success rate for each claim of the set of training claims, wherein the recovery success rate is a target output of the one or more machine learning models; and
- store the first feature set and the recovery success rates for the set of training claims as a training dataset.

17. The computing system of claim 16, wherein the computing system is further configured to automatically detect a change in the first feature set and the first claim.

18. The computing system of claim 16, wherein the computing system is further configured to train the one or more machine learning models based at least in part on the training dataset.

19. The computing system of claim 15, wherein the priority score for the first claim is the product of the predicted recovery score for the first claim and the first recoverable amount for the first claim.

20. The computing system of claim 15, wherein dynamically providing the update to the first user interface element and the second user interface element comprises pushing the update.

21. The computing system of claim 15, wherein the computing system is further configured to:
- determine a predicted recovery score for each of the first plurality of claims; and
- determine a priority score for each of the first plurality of claims.

* * * * *

UNITED STATES PATENT AND TRADEMARK OFFICE
CERTIFICATE OF CORRECTION

PATENT NO. : 11,270,156 B2
APPLICATION NO. : 16/021289
DATED : March 8, 2022
INVENTOR(S) : Cogan et al.

It is certified that error appears in the above-identified patent and that said Letters Patent is hereby corrected as shown below:

On the Title Page

"(72) Inventors: Peter Cogan, Dublin (IE); Lorcan B. MacManus, County Kildare (IE); Conor Breen, Dublin (IE)"

Should read:
--(72) Inventors: Peter Cogan, Dublin (IE); Lorcan B. Mac Manus, County Kildare (IE); Conor Breen, Dublin (IE)--

In the Claims

Column 22
Lines 13-14, "on the corresponding predicted recovery score for the first claim and a corresponding recoverable amount;"

Should read:
--on the corresponding predicted recovery score and a corresponding recoverable amount;--

Signed and Sealed this
Thirty-first Day of May, 2022

Katherine Kelly Vidal
*Director of the United States Patent and Trademark Office*